United States Patent [19]
Wong et al.

[11] Patent Number: 6,014,570
[45] Date of Patent: Jan. 11, 2000

[54] EFFICIENT RADIO SIGNAL DIVERSITY COMBINING USING A SMALL SET OF DISCRETE AMPLITUDE AND PHASE WEIGHTS

[75] Inventors: Piu Bill Wong, Daly City; Donald Clyde Cox, Stanford, both of Calif.

[73] Assignee: The Board of Trustees of the Leland Stanford Junior University, Stanford, Calif.

[21] Appl. No.: 08/564,206

[22] PCT Filed: Dec. 18, 1995

[86] PCT No.: PCT/US95/16654

§ 371 Date: Apr. 8, 1996

§ 102(e) Date: Apr. 8, 1996

[51] Int. Cl.[7] .................................................... H04Q 7/00
[52] U.S. Cl. ............................................................. 455/500
[58] Field of Search .................................... 455/500, 504, 455/138, 277.1, 279.1, 278.1; 375/347

[56] References Cited

U.S. PATENT DOCUMENTS 3,879,664   4/1975   Monsen .
3,909,720   9/1975   Fantera .

(List continued on next page.)

OTHER PUBLICATIONS

D.C. Cox, "Universal Digital Portable Radio Communications", IEEE Proceedings, vol. 75, No. 4, pp. 436–437, Apr. 1987, U.S.A.
R.C. Bernhardt, "User Access in Portable Radio Systems in a Co–Channel Interference Environment", *IEEE Journal on Selected Areas in Communications*, vol. 7, No. 1, pp. 49–58, Jan. 1989, U.S.A.
P.B. Wong and D.C. Cox, "Low–Complexity Co–channel Interference Cancellation and Macroscopic Diversity for High Capacity PCS", Conf. Record IEEE ICC '95, Seattle, WA, pp. 852–857, Jun. 18–22, 1995.
TR–INS–001313, "Generic Criteria for Version 0.1 Wireless Access Communications Systems (WACS)", *Bellcore, Issue* Oct. 1, 1993, Revision Jun. 1, 1994, U.S.A.
D.C. Cox, "Wireless Personal Communications: What Is It?", *IEEE Personal Communications*, pp. 20–35, Apr. 1995, U.S.A.
J. C–I Chuang and N.R. Sollenberger, "Burst Coherent Demodulation With Combined Symbol Timing, Frequency Offset Estimation and Diversity Selection", *IEEE Transactions on Communications*, vol. 30, No. 7, pp. 1157–1164, Jul. 1991, U.S.A.

(List continued on next page.)

*Primary Examiner*—William Cumming
*Attorney, Agent, or Firm*—Lumen Intellectual Property Services

[57] ABSTRACT

A method and apparatus for diversity-combining two electromagnetic signals (11,21) within a receiver (25). Two separated antennas (10,20) are employed. The antennas (10,20) are separated by some combination of spatial, polarization, and pattern separation. The first antenna (10) receives the first signal (11), and the second antenna (20) receives the second signal (21). Coupled to at least one of the antennas (10,20) is a circuit (12) for varying the gain and the phase of the signal (11,21) received at said antenna (10 or 20, respectively). The gain and the phase are constrained to be selected from within a finite set of preselected discrete gains and a finite set of preselected discrete phases. A search module (6) searches through all of the gain/phase combinations to optimize the signal-to-impairment ratio within the receiver (25). When the signal-to-impairment ratio is optimized, the gain and the phase are fixedly established. The search (6) is broken into two discrete searches, a relatively coarse search and a relatively fine search. The searching step (6) is typically performed whenever the signal-to-impairment ratio falls below a preselected value. A smart rounding module (14) can be used to recover the phase of the carrier of the combined signal (22) without any significant performance degradation.

20 Claims, 9 Drawing Sheets

U.S. PATENT DOCUMENTS

| | | |
|---|---|---|
| 3,964,065 | 6/1976 | Roberts et al. . |
| 4,354,276 | 10/1982 | Karabinis . |
| 4,386,435 | 5/1983 | Ulmer et al. . |
| 4,769,825 | 9/1988 | Vogel . |
| 4,805,229 | 2/1989 | Mobley . |
| 5,031,193 | 7/1991 | Atkinson et al. . |
| 5,109,392 | 4/1992 | McDonald . |
| 5,280,472 | 1/1994 | Gihousen et al. . |
| 5,335,251 | 8/1994 | Onishi et al. . |
| 5,361,404 | 11/1994 | Dent . |
| 5,457,712 | 10/1995 | Weerackody . |
| 5,461,646 | 10/1995 | Anvari . |
| 5,465,271 | 11/1995 | Hladik et al. . |
| 5,481,570 | 1/1996 | Winters . |
| 5,506,871 | 4/1996 | Hwang et al. . |
| 5,671,221 | 9/1997 | Yang . |
| 5,684,836 | 11/1997 | Nagayasu et al. . |
| 5,696,792 | 12/1997 | Sudo et al. . |

OTHER PUBLICATIONS

J. C–I Chuang and N. Sollenberger, "Burst Coherent Detection With Robust Frequency and Timing Estimation for Portable Radio Communications", Conf. Record IEEE Globecom '88, Hollywood, FL, pp. 804–809, Nov. 28–Dec. 1, 1988.

J. C–I Chuang, "The Effects of Time Delay Spread on Portable Radio Communications Channels with Digital Modulation", *IEEE Journal on Selected Areas in Communications,* vol. SAC–5, No. 5, pp. 879–889, Jun. 1987, U.S.A.

P.B. Wong and D.C. Cox, "A Low–Complexity Wireless Receiver for Co–channel Interference Cancellation and Frequency Selective Fading Mitigation", hard copy of viewgraphs shown at meeting of Bay Area Wireless Communications Alliance, Hewlett–Packard, Santa Clara, CA, Oct. 17, 1995.

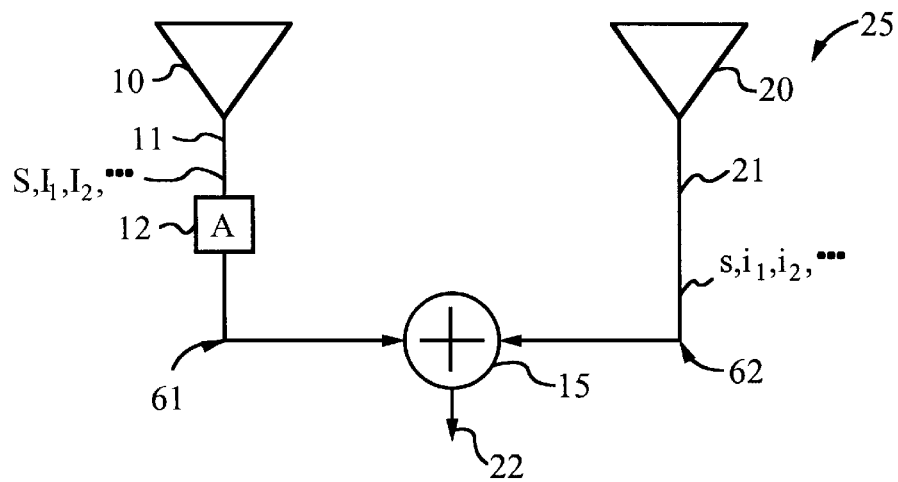
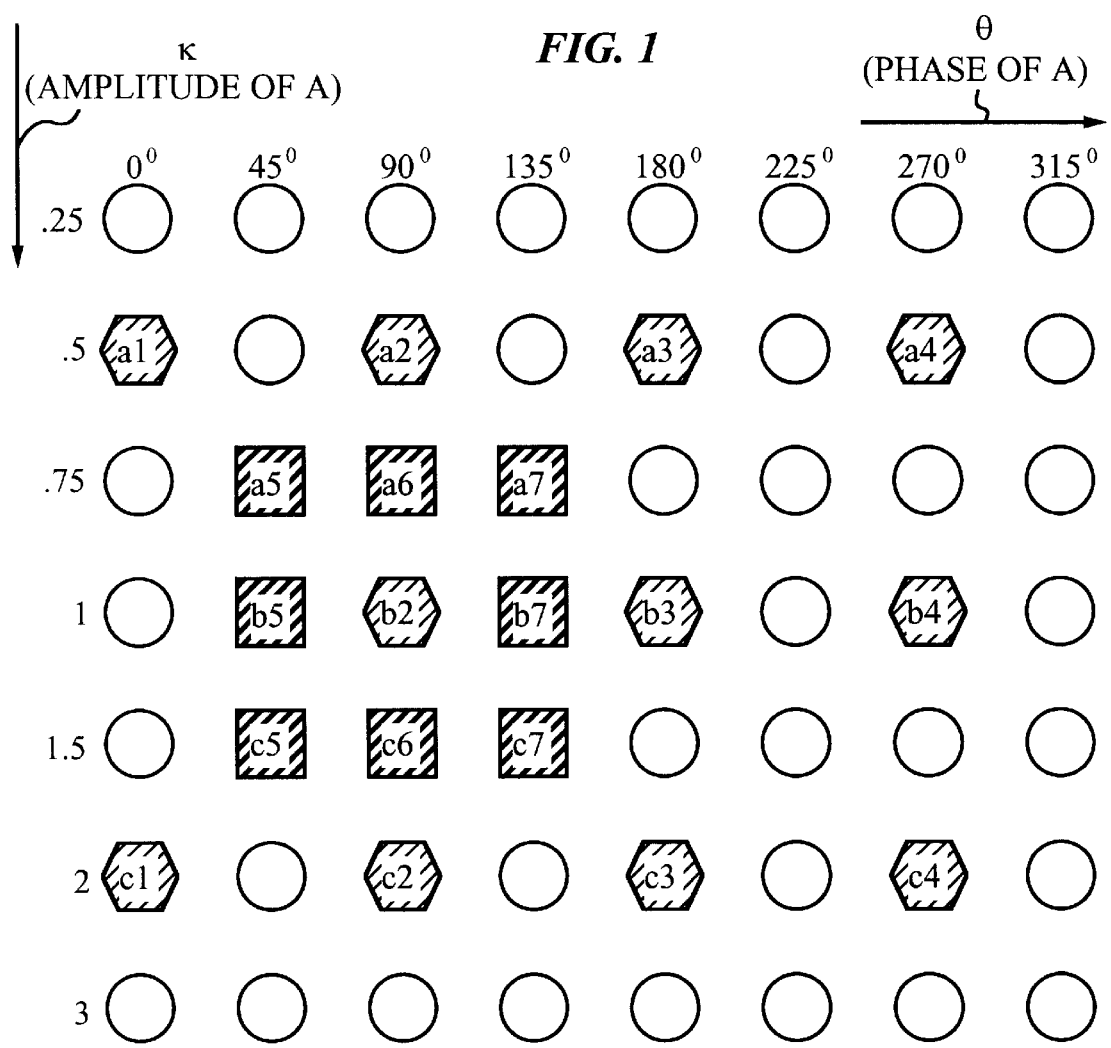

EFFICIENT RADIO SIGNAL DIVERSITY COMBINING USING A SMALL SET OF DISCRETE AMPLITUDE AND PHASE WEIGHTS

TECHNICAL FIELD

This invention pertains to the field of combining electromagnetic signals from separated antennas, in order to cancel co-channel interference and to mitigate frequency selective fading.

BACKGROUND ART

The following references are cited in this specification, using the following reference numbers:

[1] D. C. Cox, "Universal Digital Portable Radio Communications", *IEEE Proceedings*, Vol. 75, No. 4, pp. 436–477, April 1987.

[2] R. C. Bernhardt, "User Access in Portable Radio Systems in a Co-channel Interference Environment", *IEEE Journal on Selected Areas in Communications*, vol. 7, no. 1, pp. 49–58, January 1989.

[3] P. B. Wong, and D. C. Cox, "Low-Complexity Co-channel Interference Cancellation and Macroscopic Diversity for High Capacity PCS", *Conf. Record IEEE ICC '95*, Seattle, Wash., pp. 852–857, Jun. 18–22, 1995.

[4] TR-INS-001313, "Generic Criteria for Version 0.1 Wireless Access Communications Systems (WACS)", *Bellcore*, Issue 1, October 1993; Revision 1, June 1994.

[5] D. C. Cox, "Wireless Personal Communications: What Is It", *IEEE Personal Communications*, pp. 20–35, April 1995.

[6] D. E. Thomas, and P. R. Moorby, *The Verilog hardware description language*, 2nd ed. Boston: Kluwer Academic Pub., 1995.

[7] E. Sternheim et al., *Digital design and synthesis with Verilog HDL*, San Jose, Calif.: Automata Pub. Co., 1993.

[8] J. C.-I. Chuang and N. R. Sollenberger, "Burst Coherent Demodulation With Combined Symbol Timing, Frequency Offset Estimation, and Diversity Selection", *IEEE Transactions on Communications*, vol. 39, no. 7, pp. 1157–64, July 1991.

[9] J. C.-I. Chuang and N. R. Sollenberger, "Burst Coherent Detection with Robust Frequency and Timing Estimation for Portable Radio Communications", *Conf. Record IEEE GLOBECOM '88*, Hollywood, Fla., pp. 804–9, Nov. 28–Dec. 1, 1988.

[10] J. C.-I. Chuang, "The Effects of Time Delay Spread on Portable Radio Communications Channels with Digital Modulation", *IEEE Journal on Selected Areas in Communications*, vol. sac-5, no. 5, pp. 879–889, June 1987.

DISCLOSURE OF INVENTION

The present invention is a method and apparatus for diversity-combining two electromagnetic signals (11,21) within a receiver (25). Coupled to the receiver (25) are two antennas, a first antenna (10) for receiving said first signal (11) and a second antenna (20) for receiving said second signal (21). Coupled to at least one of the antennas (10,20) is a circuit (12) for varying the gain and the phase of the signal (11 or 21) received at said antenna (10 or 20). The gain and the phase are constrained to be selected from within a finite set of preselected discrete gains and a finite set of preselected discrete phases.

BRIEF DESCRIPTION OF THE DRAWINGS

These and other more detailed and specific objects and features of the present invention are more fully disclosed in the following specification, reference being had to the accompanying drawings, in which:

FIG. 1 is a block diagram illustrating the microscopic diversity combining of the present invention using two receiving antennas 10, 20.

FIG. 2 illustrates an example of a set of complex weights A used for diversity combining. Complex weights A used for the coarse step search are represented by the hexagonal markers and those used for a particular example of a fine step search are represented by the shaded rectangular markers.

DETAILED DESCRIPTION OF THE PREFERRED EMBODIMENTS

1 Introduction

Figure 3:
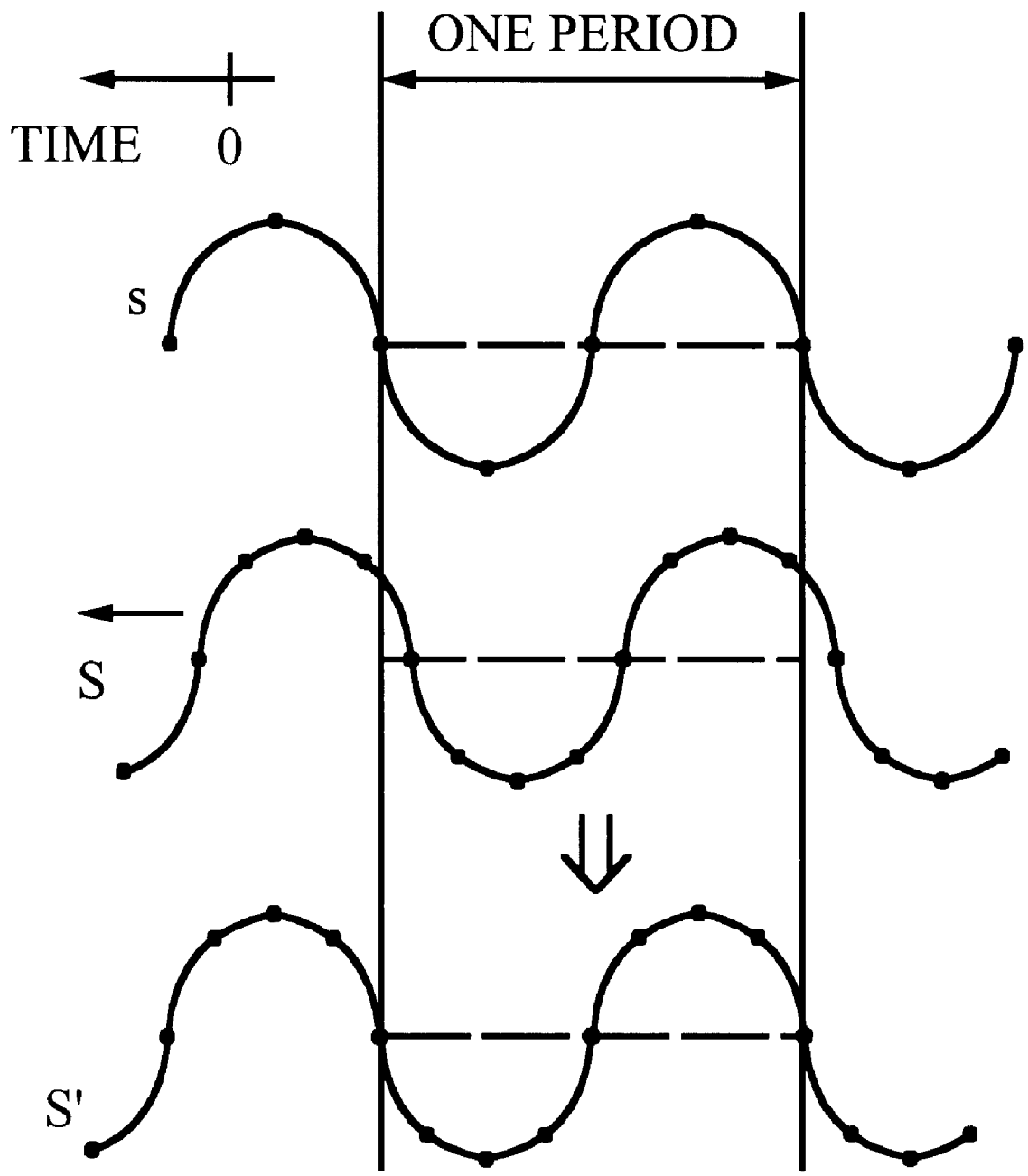
FIG. 3 is a set of three time-related graphs showing signals s, S, and S'. Signal S is delayed by 1 sample period to change its phase by −45° to S'. s and S' are then in phase and can be added constructively.

FIG. 1 illustrates the basic operation of a receiver 25 using the present invention. Separated antennas 10,20 are coupled to receiver 25. The antennas 10,20 are separated by some combination of spatial, polarization, and pattern separation. A first signal 11 is received by antenna 10. Signal 11 is some combination of a desired signal S and one or more interfering signals $I_1$, $I_2$, etc. Similarly, signal 21 received by antenna 20 is some combination of a desired signal s, and one or more interfering signals $i_1$, $i_2$, etc. A gain and/or attenuation circuit 12 is inserted in at least one of the two branches 61,62. Circuit 12 introduces a complex weight A into the circuit. A has a gain component (k) and a phase component (Θ). The two branches 61,61 are combined at combiner 15, forming a combined signal 22.

In a high capacity personal communication system (PCS), for a given bandwidth, co-channel interference (CCI) limits the system capacity [references 1, 2]. Usually, CCI is dominated by one co-channel interferer because of the shadowing phenomenon, which has a log-normally distributed local mean of the received signal power. Two-antenna 10,20 diversity combining (FIG. 1) as described herein is able to cancel this dominant interference and yields a signal to interference ratio (SIR) improvement of at least 3.8 dB over conventional two-antenna selection diversity [reference 3]. SIR improvement of 3.8 dB corresponds to increasing wireless TDMA/FDMA system capacity by a factor of 1.5. This system improvement is obtained with the constraint on the complex weight (A in FIG. 1) to be a value chosen from the following Equation 1, with k=3 and ΔΘ=18° [reference 3]:

$$|A| = 2^n, n = -k, \ldots, k-1 \quad \text{(equation 1)}$$

or $$= 2^n + 2^{n+1}, n = -k, \ldots, k-2$$

$$\Theta_A = m * \Delta\theta, m \in \{Z \mid 0° \le m * \Delta\theta < 360°\}$$

where k is a positive integer and Z is the set of all integers. Other values of |A| and $\Theta_A$ can be used, with fewer choices resulting in reduced performance and a larger number of choices resulting in increased performance.

The present invention uses low complexity methods and circuit architectures for diversity combining without requiring any training sequences or reference signals in the radio communication links. The United States low-tier PCS standard PACS [references 4, 5] is used herein to illustrate the present invention. However, the performance of any frequency reusing system, e.g., a PCS system, can be improved by similar combining methodologies. The methods and circuit architectures described herein have been verified in Verilog hardware description language [references 6, 7]. Hardware simulation results show that there is less than half a dB degradation from the optimum solution given the constraint that A satisfies Equation 1 with k=2 and ΔΘ=45°. As noted above, smaller increments for |A| and Δθ reduce the degradation, while larger increments result in more degradation.

Currently, PACS uses selection diversity without adaptive equalization and has an average irreducible WER (word error rate) of about 2.4% when the normalized delay spread in radio channels is about 0.16 [reference 8]. Diversity combining without adaptive equalization but using the methods and circuit architectures described in this patent application can yield the same average irreducible WER when the normalized delay spread is 0.3, which corresponds to delay spread of 1.6 μs for a symbol period of 5.2 μs. This can extend the radio range over which PACS can operate.

These system improvements can be realized with just a slight increase in signal processing complexity of two linear receivers 25 with automatic gain controls, 6-bit analog to digital conversion 2, and more digital circuitry to implement the signal combining methods. If smaller increments in |A| and Δθ are used to improve performance as noted earlier, more bits in the analog-to-digital converter 2 may also be needed.

We describe the optimization method in Section 2 below under the constraint given in Equation 1. Section 3 introduces some issues associated with implementation and our circuit architectures for two-antenna 10,20 diversity combining. Hardware simulation results for CCI cancellation and frequency selective fading mitigation are presented in Section 4.

2 Searching Method

In this section, we describe a simple but efficient method for finding the optimum complex weight A for diversity combining. This method requires less computation than the exhaustive search discussed in reference [3]. No training sequences or reference signals in the radio communication links are required in searching for the optimum complex weights A.

With the gain and the phase increment quantized to k=2 and Δθ=45°, respectively, in Equation 1, the diversity combining results are within a few tenths of a dB of the optimum combining using continuous values of gain and phase [reference 3]. FIG. 2 shows the complete set of the quantized complex weights A with phase horizontally and magnitude vertically. The magnitudes and phases for this representative set of weights A are chosen for easy circuit 12 implementation. One way to find the optimum complex weight A for diversity combining is by exhaustive search. A more computational conservative procedure is to step through the weights A in coarse steps as represented by the shaded hexagonal points in FIG. 2. For each amplitude and phase step, the signal quality (SQ) is computed 24 for the combined signal 22. Signal quality can be defined as the average opening of the eye-pattern in a burst and is a good measure of signal-to-impairment ratio at the optimum symbol timing. Reference [8] describes this SQ measurement. Then complex weights A surrounding the hexagonal complex weight A that gives the best SQ are stepped through to search for a weight yielding a better SQ.

Although SQ and SIR (signal-to-interference ratio) are used in the instant specification as examples of measures of signal quality, it must be understood that any type of signal-to-impairment ratio indication may be used, for example, detected errors. "Impairment" includes, but is not limited to, noise, co-channel interference, and inter-symbol interference.

For the example indicated by shading in FIG. 2, if the complex weight A with magnitude and phase equal to 1 and 90°, respectively (labeled b2) gives the maximum SQ for the coarse search over the shaded hexagonal points, its surrounding weights A represented by the shaded rectangular points then are searched over to find the best SQ. Then the desired complex weight A used for diversity combining is the one that yields the best SQ over the complex weights A that have been searched. This methodology of breaking the search into a relatively coarse search and a relatively fine search reduces the chance of ending on a local maximum instead of the global maximum, and eliminates the need for searching through all weights A. It is shown in Section 4.2 that this searching methodology results in little degradation when compared with exhaustive search. However this method searches over only 20 complex weights A instead of all 56 complex weights A.

3 Circuit Implementation and Architecture

The circuit architecture described in this exemplary embodiment is designed for use in a PACS [reference 4] handset receiver 25. A base station receiver 25 can use the same techniques to achieve comparable improvement in diversity combining. More circuit parallelism and complexity would be needed in a base station receiver 25 in order to handle all 8 data bursts that need to be received. The receivers 25 can be associated with transmitters to form transceivers. A group of similar transceivers are geographically positioned such that they can communicate with each other using radio frequencies. When the transmitter portion and the receiver 25 portion of the transceiver operate on the same frequency, similar circuitry and methods can be employed for the transmitter and the receiver 25. For example, the transmitter could transmit over the two antennas 10,20 using a conjugate of the phase determined by receiver 25 in the searching step 6. This would be an effective strategy for noise limited transceivers, but would not be optimum in all cases for co-channel interference limited situations.

Most of this specification describes circuits and methods used in conjunction with the receiver 25. These techniques can be adapted for receivers for use with other radio link architectures and modulations as will be obvious to one skilled in the art.

3.1 Asymmetric Sampling Rates on Two Branches 61,62

One way of adjusting the phase difference between the two received signals 11,21 for diversity combining in a digital circuit 25 is to oversample the signals 11,21, and then delay one set of samples for one of the branches (61 or 62) relative to the samples for the other branch (62 or 61). In order to introduce a minimum phase difference of 45° (without interpolation between samples) between the samples from the two receiving branches 61,62, the received signals from one branch (61 or 62) need to be sampled at a rate of 8 times the intermediate frequency (IF). The received signals from the other branch (62 or 61) can be sampled at 4 times the IF as in the earlier PACS implementation [reference 8]. Using a sampling rate of 4 times the IF provides a convenient way for burst coherent demodulation without requiring any training sequences [reference 8]. The phase shift between branches 61,62 using adjustable delay elements 7 on both branches 61,62 is between −90° and +90°. The other half of the required phase shifts (from +90° to 270°) can be obtained by negating the received signal 11,21 samples from one of the branches (61 or 62). FIG. 3 illustrates a phase shift of −45° by delaying the signal samples s of one branch (61 or 62) by 1 sample with respect to the signal samples S of the other branch (62 or 61).

Other increments of phase adjustment, $\Delta\theta$, can be produced by sampling the branches 61,62 at different oversampling rates. Greater oversampling can yield smaller $\Delta\theta$ increments, while lower oversampling will result in larger increments.

Figure 5:
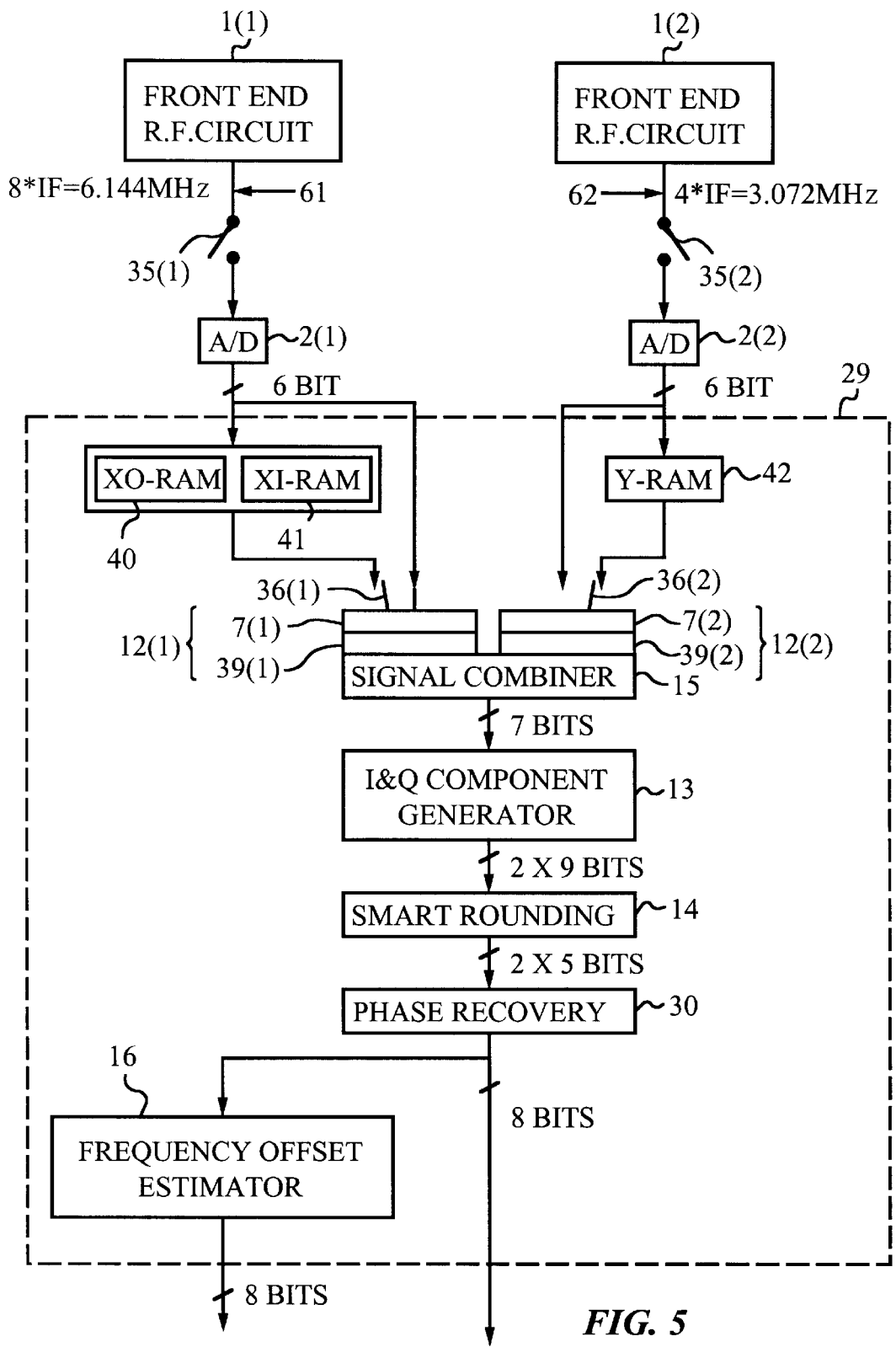
FIG. 5 is a functional block diagram showing data-path circuitry for primary, secondary, and back-up (relatively low speed) phase recovery states of the present invention (those components enclosed in dashed rectangular box 29).

FIG. 5 shows an embodiment of the present invention in which each branch 61,62 has its own gain attenuation circuit 12, comprising time delay element 7 (such as a series of latches) and gain/attenuation element 39, such as a stepped register.

The IF used in one PACS implementation is 4 times the symbol frequency (SF). Therefore, the maximum relative delay introduced by sample delaying for diversity combining is only one sixteenth of a symbol period. That is, the maximum normalized delay spread introduced by the process of diversity combining of the present invention is only 0.031 for flat fading radio propagation channel. It is shown later in Section 4.2 that this additional intersymbol interference causes insignificant degradation in the overall system performance. For frequency selective fading channels, the overall intersymbol interference is actually reduced by the diversity combining of the present invention (Section 4.3), even though the combining process introduces small delay spread for flat fading channels.

3.2 System Overview

Figure 4:
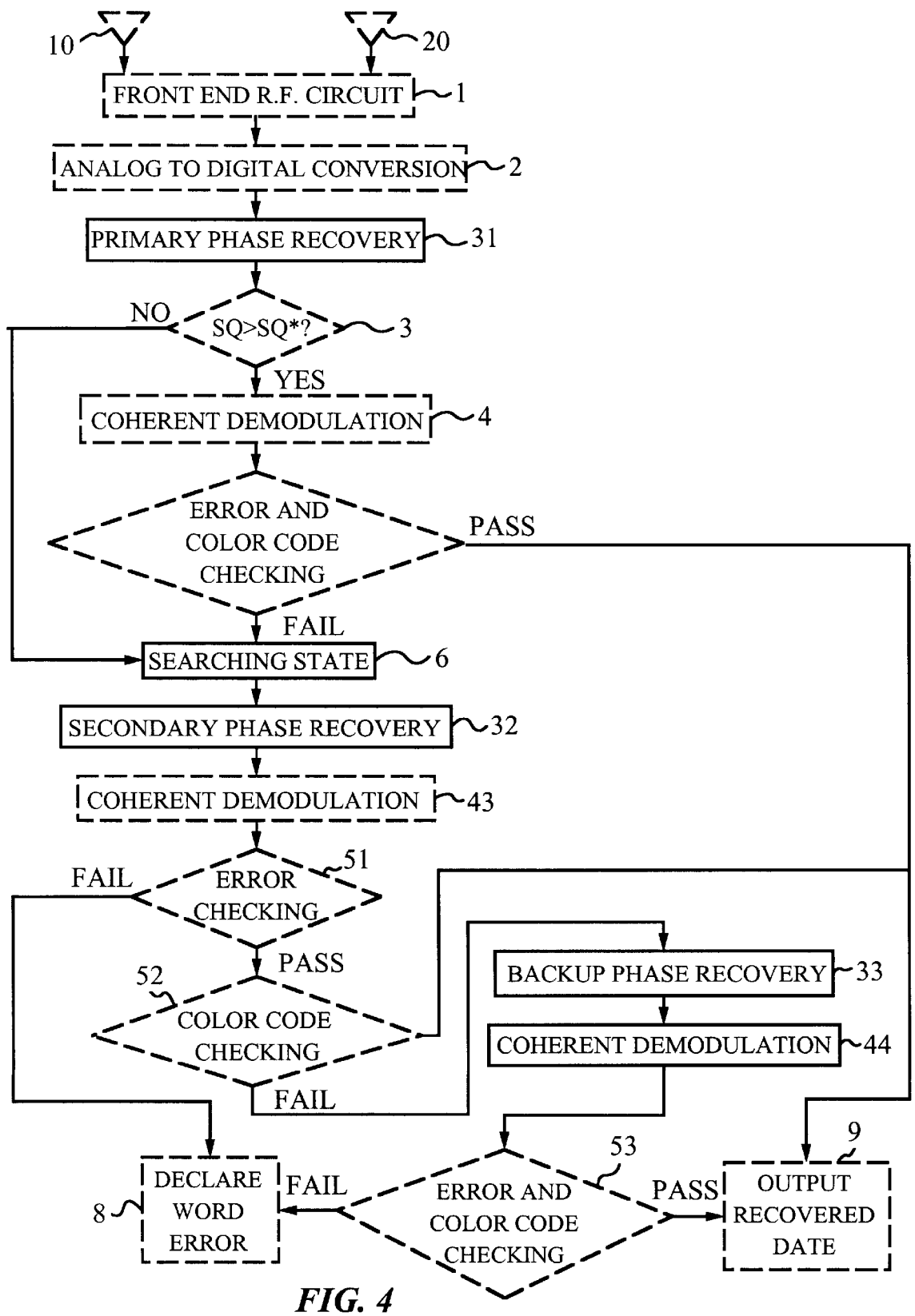
FIG. 4 is a process flow diagram illustrating the diversity combining of the present invention in a receiver 25. Functional units enclosed in the solid boxes are unique to the present invention.

FIG. 4 shows an overview of the process flow in a receiver 25. The functionalities of each individual block are described in this subsection. Circuit architecture designs of the functional units enclosed in the solid boxes art presented in the following subsections. Reference [4] discusses the design and performance of the other functional units enclosed in the dashed boxes, except the signal quality comparison unit 3, which is a conventional circuit just requiring subtracting two numbers.

The received signals from the two antennas 10,20 are first processed by the front end radio frequency circuitry 1 to amplify and convert them to an intermediate frequency and remove the adjacent channel signals. The signals are then oversampled and quantized by analog-to-digital converter 2. The quantized signals from the two receiving branches 61,62 are combined by combiner 15 and the phase of the carrier is recovered in the primary phase recovery (PPR) circuit 31. The PPR circuit 31 uses the complex weight A and symbol timing found/used in the previous received burst. Previous complex weights and symbol timing are not available initially. Random complex weights A and symbol timing are initially used in the PPR unit 31. After PPR using random complex weights A and symbol timing is performed, the circuit 31 will likely activate the searching state 6 for finding the optimum complex weight A and symbol timing for the initial set of data.

Signal quality (SQ) of the recovered phase is then compared with a predefined SQ threshold (SQ*), at comparator 3. SQ* is chosen to provide an acceptable word error rate. If the SQ is larger than the SQ*, the recovered phase is coherently demodulated by demodulator 4. Otherwise, the searching state (SS) 6 is activated. After coherent demodulation 4, the recovered bits are checked 5 for error, and to see if the co-channel color code is correct [reference 3]. If both checks are passed, the recovered data burst is transferred to the output 9. Otherwise, the SS 6 is activated.

The searching state 6 uses the searching method described in Section 2 to search for the optimum complex weights A for signal combining. Symbol timing corresponding to both the optimum complex weights A and the negation of these weights A are also found in SS 6. Symbol timing can be different for different complex weights A used in the diversity combining process. The secondary phase recovery (SPR) circuit 32 uses the optimum complex weight A and symbol timing provided by SS 6 to combine the received signals 11,21 and recover the phase of their carrier. The recovered phase is then coherently demodulated at 43. If the recovered data burst contains any errors, as detected by error checking module 51, a word error is declared 8 and the recovered burst is discarded. If no errors are detected, the color code is checked by module 52. If the color code matches the desired one, the recovered data burst is transferred to the output 9. Otherwise, backup phase recovery (BPR) circuit 33 is activated. A data burst that is error free but fails the color code check is very likely to be from a dominant interference [I or i in FIG. 1], indicating that it has been enhanced, but the desired signal [S or s] reduced by the diversity combining. Using the negation of the optimum complex weights A for signal combining can partially cancel this dominant interference and add the desired signals [S,s] constructively. The BPR circuit 33 uses the negation of the optimum complex weight A and the corresponding optimum symbol timing to recover the phases. The recovered phases are then coherently demodulated by demodulator 44 and checked for error and color code by module 53. If both checks are passed, the data burst is transferred to the output 9. Otherwise, the received data burst is discarded at 8.

Other sequences are possible.

3.3 Major Building Blocks

All the bit lines drawn in the Figs. and the architectures discussed in Section 3 have been verified in Verilog hardware description language.

3.3.1 Signal Combining and Digital Automatic Gain Control

In order to preserve the amplitude information for diversity combining, one can not use the hard limiter and 4-bit signal quantization used in the original PACS receiver 25. We have carried out Monte Carlo simulations to study the effect of quantization noise on system performance. Using 5 bits for signal quantization, there is about 0.3 dB degradation of system performance for diversity combining when using linear amplifiers with perfect automatic gain controls (AGCs). To relax the perfect AGC requirement, one can use one extra bit for signal quantization. Using 6 bits for signal quantization and the set of complex weights A shown in FIG. 2, combining the received signals 11,21 from the two receiving branches 61,62 can be done with one 7-bit 3-2 adder 15, one 7-bit full adder 15, and some delay elements (latches) 7. As noted earlier, combining with increased or decreased degradation will require more or fewer bits of signal quantization, respectively.

After signal combining, the amplitude of the combined signal 22 can be large when the two received signals 11,21 are used mainly to increase the desired signal power, or small when the two received signals 11,21 are used mainly to cancel the dominant interference. Which condition occurs depends on the relative phases and amplitudes of the signal S,s and interference I,i in the two branches. Therefore, we need a "digital AGC" after signal combining, so that both cases can be represented by the same number of bits while avoiding wasting hardware resources by carrying zero leading bits.

The ratio of the quadrature component and the inphase component determines the phase of the received signal 22. If both components' leading bits are zeros after signal combining, we can shift the bits of both values to the left by two registers until the most significant bit (MSB) of one or both of the values is/are 1. Then the two components can be truncated into two 5-bit values. We call this smart rounding (module 14 in FIG. 5). It is essentially equivalent to a "digital AGC". Using smart rounding, we can round a 9-bit value to a 5-bit value for each component without losing significance in recovered phase of the carrier, and can reduce the size of memory for the phase lookup table dramatically (by a factor of $2^8$).

While QPSK modulation has been used to illustrate the operation of this invention, it must be understood that any type of modulation, including analog modulation, can be used. When analog modulation is used, A/D converters 2 are still used.

3.3.2 Decoding Circuitry

FIG. 5 shows the major data-path circuit components 29 for primary, secondary and back-up phase recovery states (PPR 31, SPR 32, and BPR 33, respectively). The received signals from one branch 61 are sampled at 6.144 MHz (8*IF) by switch 35 (1), and then quantized to 6 bits per sample, by A/D converter 2 (1). The received signals from the other branch 62 are sampled at a lower rate of 3.072 MHz (4*IF) by switch 35 (2), and quantized to the same bit precision, by A/D converter 2 (2). Alternatively, the same A/D converter 2 could be used for both branches 61,62 in combination with sample and hold circuits, as is well known in the art. The received quantized samples are stored into three memory blocks of 744 bytes each, named X0-RAM 40, X1-RAM 41, and Y-RAM 42. 744 bytes=6 bits * 16 samples per symbol * (60+2) symbols/8 bits. The extra 2 symbol storage is used as backup because there may be shifting in symbol timing between received bursts. Samples of the higher sampling rate are interleaved between the X0-RAM 40 and X1-RAM 41. Samples stored in these three memory blocks 40, 41, 42 are used in the searching 6, SPR 32, and BPR 33 states. The PPR state 31 uses samples directly from the outputs of the two analog to digital converters 2. This is desirable, because memory 40,41,42 is avoided, saving power.

Since the optimum symbol timing is provided to the phase recovery states, this data path circuitry 29 calculates only one 8-bit phase value per symbol. This is different from the design in reference [8] where the optimum symbol timing is found for every received burst, and hence the phase recovery circuitry needs to calculate 16 8-bit phase values for each symbol.

Processes implemented in the I and Q component generator 13, phase recovery circuit 30, and frequency offset estimator 16 are described in reference [8]. Frequency offset estimator 16 measures signal quality, gives coherence, and combats frequency mismatch in the oscillators of the receiver 25 and transmitter, for this QPSK embodiment. The processes implemented in the signal combiner 15 and the smart rounding module 14 are discussed in the previous subsection. Functional units outside the dashed rectangular box 29 are not discussed at length in this specification, and are coded in C computer language using floating point computation for the overall system level simulations described later.

3.3.3 Searching Circuitry

Figure 6:
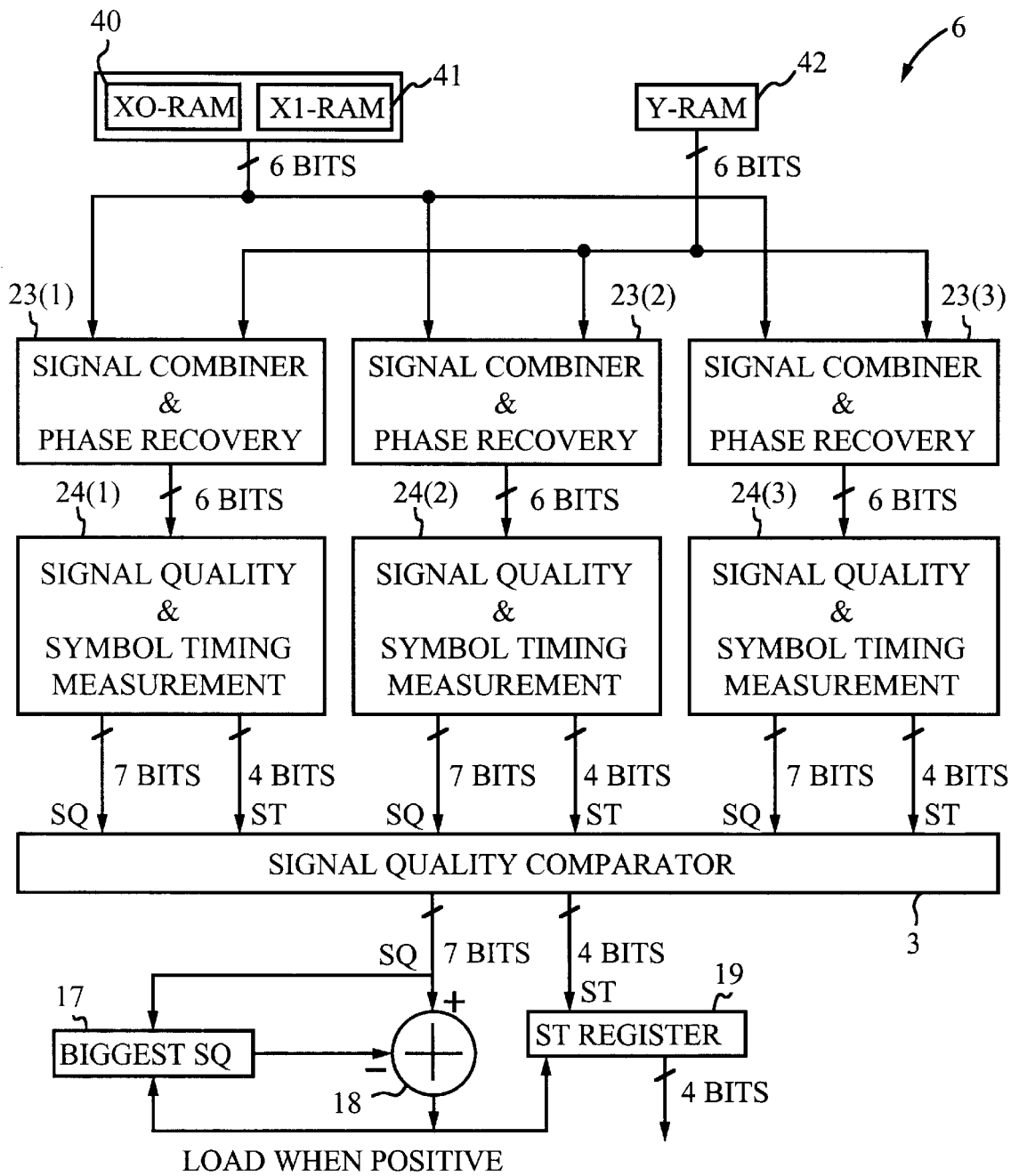
FIG. 6 is a functional block diagram showing parallel (relatively high speed) data-path circuitry for searching for the optimum complex weights A for signal combining and for the corresponding optimum symbol timing.

FIG. 6 shows the data-path circuit components 6 used to search for the optimum complex weight A for diversity combining, and to find the optimum symbol timings corresponding to both the optimum complex weight A and its negation. The searching circuitry 6 described in FIG. 6 contains three major parallel circuit blocks. If time is not of the essence, one block or two parallel blocks can be used. If time is more of a problem, a greater number of parallel blocks can be used. There is a tradeoff between circuit complexity and time. Alternatively, one block can be used to meet the same time constraint if it is clocked at a greater rate, as will be obvious to one skilled in the art.

The memory blocks 40,41,42 are the same as those shown in FIG. 5. The signal combiner and phase recovery blocks 23 are basically the same as the ones used in the decoding circuitry, described previously, except they are more pipelined, and the recovered phase is a 6-bit value instead of 8-bit. This 2 bit reduction in representing phase value results because only the 6 least significant bits of a recovered phase are needed for SQ and symbol timing measurements by modules 24. The methods and circuit architectures for the SQ and symbol timing measurements 24 are discussed in detail in reference [8]. As indicated above, SQ is just one example of signal-to-impairment ratio. Thus, in the general case, circuit 24 is a signal-to-impairment ratio and symbol timing measurement circuit.

The searching circuitry 6 uses methods discussed in Section 2 to search for the optimum complex weights A. Throughout the coarse search (represented by the shaded hexagonal points in FIG. 2), the Y-RAM 42 and only one of the X-RAMs 40,41 are accessed. During each memory access, this circuitry 24 measures three different SQs and symbol timings (STs) for three different complex weights A. These three SQs and STs are fed to signal quality comparator 3, which compares the three SQs, chooses the highest SQ, and passes said highest SQ to biggest SQ register 17 and to adder 18. Comparator 3 also passes the ST associated with the highest SQ to ST register 19.

After a total of four memory accesses for the coarse step search, the X-RAM 40,41 used in the coarse step search and the Y-RAM 42 are accessed one more time for the fine step search (represented by the shaded rectangular points shown in FIG. 2 for a particular case). Afterwards, the other X-RAM 41,40 and the Y-RAM 42 are accessed twice for the fine step search. That is, the searching circuitry needs to run only 7 times to search over 20 different complex weights A to find the desired set for signal combining. All the signal quality comparisons from this searching circuitry 6 are sent to a control circuit unit (not illustrated) where the desired complex weight A is determined (that weight giving the highest SQ). Note that the complex weights A used in the coarse step search are always the same for any received burst, but the complex weights used in the fine step search can be different for each individual burst.

The optimum symbol timing corresponding to the optimum complex weight is the final value stored in the symbol timing (ST) register 19. When finding the optimum symbol timing for the negation of the optimum complex weight, which is needed in the BPR state 33, only one third of the searching circuitry is activated. The contents of register 19 are outputted to RAMs 40,41, and 42. This information instructs RAMs 40,41,42 when to give their outputs to combiner 15.

3.4 Real Time Scheduling for Burst Demodulation

Figure 7:
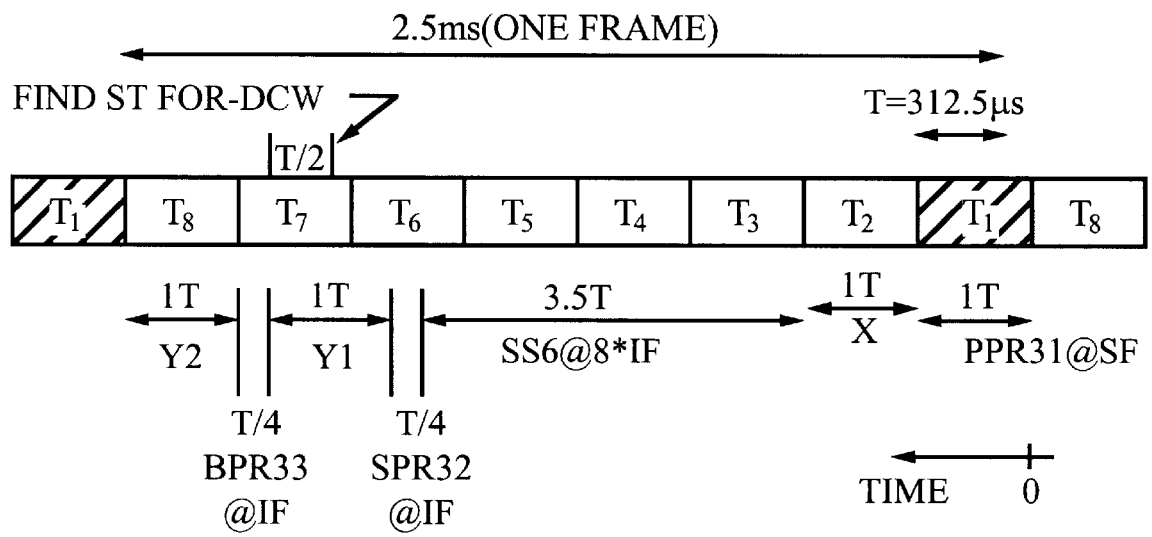
FIG. 7 is a timing schedule for phase recovery 29 and searching states 6, and their corresponding clock frequencies in one PACS TDMA frame period. Data are assumed to be received in the first time slot, T1 (the shaded area).

FIG. 7 shows one TDMA frame period for a PACS radio communication downlink. The following terms are used in FIG. 7:

| KEY: | | | |
|---|---|---|---|
| PPR | primary phase recovery 31 | IF | intermediate frequency (768 KHZ) |
| SPR | secondary phase recovery 32 | | |
| BPR | backup phase recovery 33 | SF | symbol frequency (192 KHz) |
| SS | searching state 6 | | |
| X | signal quality comparison 3, coherent demodulation 4, error and color code checking 5 | ST | symbol timing |
| | | DCW | desired complex weight A |
| Y1 | coherent demodulation 43, error and color code checking 51, 52 | | |
| Y2 | coherent demodulation 44, error and color code checking 53 | | |

One frame period of 2.5 ms, i.e., a frame rate of 400 Hz, is divided into 8 individual bursts. Processing timing has been selected to insure that the received signals after diversity combining are decoded within one frame period after the first sample of the desired burst is received, while keeping the maximum clock frequency used in the circuit at a maximum rate of 6.144 MHz (8*IF). Transmission delay of speech is increased by about 2 ms compared to the original PACS selection diversity receiver. (This delay could be reduced by using higher clock frequencies, which would increase somewhat the power consumption.)

One frame period is partitioned into different phase recovery searching states. As shown in FIG. 7, each state uses a different clock frequency except the secondary 32 and backup 33 phase recovery states, which use the same frequency. For a fading rate of 3 Hz, which is ¾% of the frame rate, or less, the circuit activates the primary phase recovery (PPR) state 31 only most of the time. Since only one phase value per symbol is calculated in the PPR state 31, most of its data path circuit components run at a clock frequency of the symbol frequency (192 KHz). Control circuit units always run at 8 times the intermediate frequency (8*IF= 6.144 MHz), i.e., at the maximum sampling frequency of one of the two branches.

There is one burst period, labeled X, between the PPR state 31 and the searching state 6, and also right after the other phase recovery states (labeled Y1 and Y2). These time periods are reserved for coherent demodulation 4,43,44, error checking 5,51,53, and color code checking 5,52,53. These functional blocks are conventional and are therefore not discussed at length in this specification. They are covered in reference [4].

In order to conserve energy, the searching state 6, which runs at 8*IF=6.144 MHz, is activated only if the signal quality (SQ) measured in the PPR state 31 falls below a predefined SQ threshold (SQ*), if there is a decoding error, or if the color code checking 5 fails. The searching state 6 finds the optimum complex weight A using the searching method described in Section 2 and its corresponding symbol timing for diversity combining in the secondary phase recovery (SPR) state 32, which runs at IF.

The handset receiver 25 activates the back-up phase recovery (BPR) state 33 using a clock frequency of the IF, only when the color code fails 52 in the SPR state 32. The BPR state 33 uses the negation of the optimum complex weight A found in the searching state 6 and its corresponding symbol timing found right after SPR state 32 (as shown in FIG. 7) for signal combining and phase recovery. The symbol timing for the BPR state 33 uses one third of the SS circuitry 6, as noted in the previous subsection.

4 Hardware Simulations and Results

This section describes simulation procedures and radio channel modeling for our computer simulations, and presents some system evaluation results. The simulations were carried out for both co-channel interference dominated and intersymbol interference (ISI) dominated cases.

4.1 Simulation Procedures

Radio channel models for both co-channel interference and ISI limited cases are discussed in their own subsections. We describe simulation procedures that are common to both cases in this subsection.

Phase recovery stage 29 and searching 6 for the optimum complex weight A were coded in Verilog hardware description language with the corresponding timing schedules, clock frequencies and finite number of bits for computation as discussed earlier. The rest of the functional units needed in the system simulation were coded in C computer language using floating point computation.

Additive white Gaussiam noise (AWGN) was not included in the simulations. The only noise in our simulations was the quantization noise due to the finite number of bits used in the signal quantization and the integer hardware computation (shown in FIGS. 5 and 6).

Quasi-static channels are assumed in the simulations. That is, the channel is assumed to be constant throughout a single burst. The following lists the other conditions that were used in the computer simulations:

Random independent transmitted data for each base station and each individual burst.

π/4 QPSK modulation with differential encoding and Gray encoding [reference 4].

Nyquist raised-cosine spectral shaping with roll-off factor of 0.5 [reference 4].

Uniformly distributed symbol timing in a symbol period (not restricted to the 16 sampling points in a symbol).

Uniformly distributed frequency offset between ±11% of the symbol rate (corresponding to 10.6 ppm at radio frequency of 2 GHz).

Linear amplifiers with AGC in the receiver.

6-bit signal quantization.

Second order phase lock loop with phase loop gain of $2^{-2}$ and frequency loop gain of $2^{-6}$ [reference 9].

4.2 Co-channel Interference Cancellation

The following conditions, in addition to those described in the previous subsection, were used in the computer simulations for co-channel interference cancellation:

8 channel sets ($C_s$=8).

Square cell geometry.

First tier co-channel base stations 25 only.

Random asynchronous transmitting times among base stations 25.

Handset 25 located at the statistically worst area.

Received signal statistics are log-normally and Rayleigh-distributed.

Path loss exponent of 4 (n=4) in $d^{-n}$ propagation.

Standard deviation of log-normal fading of 10 dB (σ=10 dB).

Reference [3] contains detailed descriptions of the simulation procedures and these conditions.

Before we could compare the results from the hardware simulations to the computer simulation results in reference [3], we needed to relate average SQ measure to SIR in interference limited environments. In order to do this, we first generated 8 random co-channel interference signal carriers with independent log-normal and Rayleigh statistics. The desired signal carrier was then generated and properly scaled to yield the required SIR. Random data streams were then added to these carriers. Every received burst had a different set of carriers and data streams. SQ of a burst was then measured from the output of the phase recovery circuitry with no diversity using the Verilog simulations. The average normalized SQs [reference 8], averaged over 20 bursts and 40 bursts, versus SIR are plotted in FIG. 8.

Figure 8:
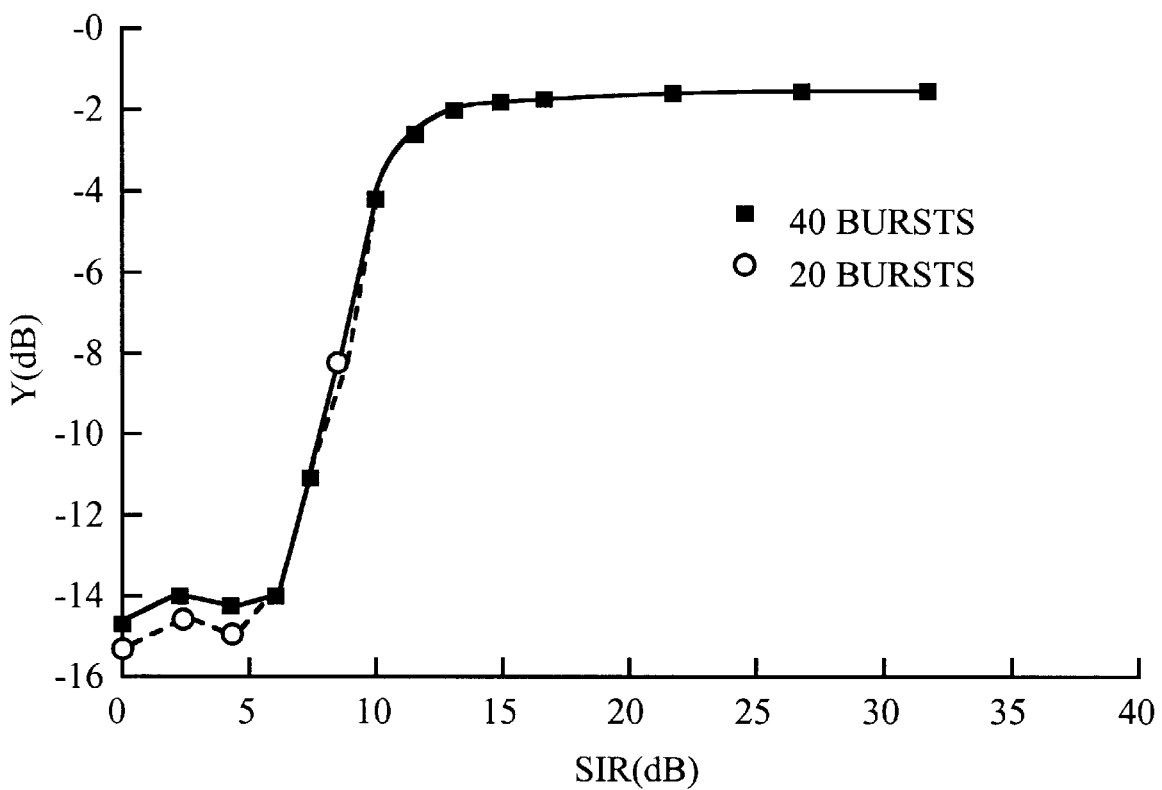
FIG. 8 is a set of two graphs showing simulated average normalized signal quality (y) versus SIR in an interference limited environment.

FIG. 8 shows that the average normalized SQ converges reasonably well using just 20 bursts for the SQ measurement in the region where SIR is larger than 6 dB. This includes the region, from 8 dB to 20 dB, that we are most interested in. Below 8 dB the error rate is too high to be usable, while above 20 dB the error rate becomes essentially zero. This figure is very similar to FIG. 5 presented in reference [8]. Particularly, when SIR and SNR are larger that 15 dB, these two Figures are almost the same. The difference between the two Figures is mainly attributable to different impairments being introduced in the computer simulations: AWGN is used in reference [8], while co-channel interference is used for the results presented in FIG. 8.

For the next step in the simulation process, 1483 independent bursts with macroscopic selection diversity based on power measurement were generated. This is the same case as the one presented in FIG. 4 in reference [3], except that k=2 and Δθ=45° in Equation 1 are used here instead of k=3 and Δθ=18° in reference [3]. SIRs are calculated for these 1483 bursts, both from the signal carriers alone as described in reference [3], and from SQ measurement in the hardware simulations, for single antenna, selection diversity, and combining diversity, The measured SQ is mapped into SIR using the plot shown in FIG. 8 for the 40 burst case and using linear interpolation between data points. Simulated cumulative distributions of SIRs are plotted in FIG. 9. The continuous curves are from SQ measurement in the hardware simulations, and the discrete data points are from signal carrier (SC) calculation.

The SQ measurement results agree very well with the SC calculation results for SIRs between 8 dB and 20 dB, i.e., the region of interest, for the single antenna and selection diversity cases. The slight difference is due to mapping uncertainties (the SQ to SIR mapping is an averaging process) and mapping inaccuracies (using linear interpolation between data points). For the same range of SIR, combining diversity of the present invention experiences small degradation (less than half a dB) when compared to the SC calculation results because of the following reasons:

ISI is introduced in the hardware simulations by shifting the received samples to get the required phase for signal combining.

There is no frequency offset in the SC calculation, and therefore Δθ=45° is exact. Because of the frequency offset in the hardware simulations, Δθ is not exactly 45°.

Exhaustive search, which is guaranteed to find the optimum solution, is used in SC calculation. The searching method described in Section 2 is used in the hardware simulations.

There is increasing disagreement between hardware simulation results based on SQ measurement and SC calculation results for SIR less than 6 dB and larger than 20 dB in all three cases. This is because SQ saturates at both high and low SIR, and different effects, like quantization noise, become significant at low SIR.

Figure 10:
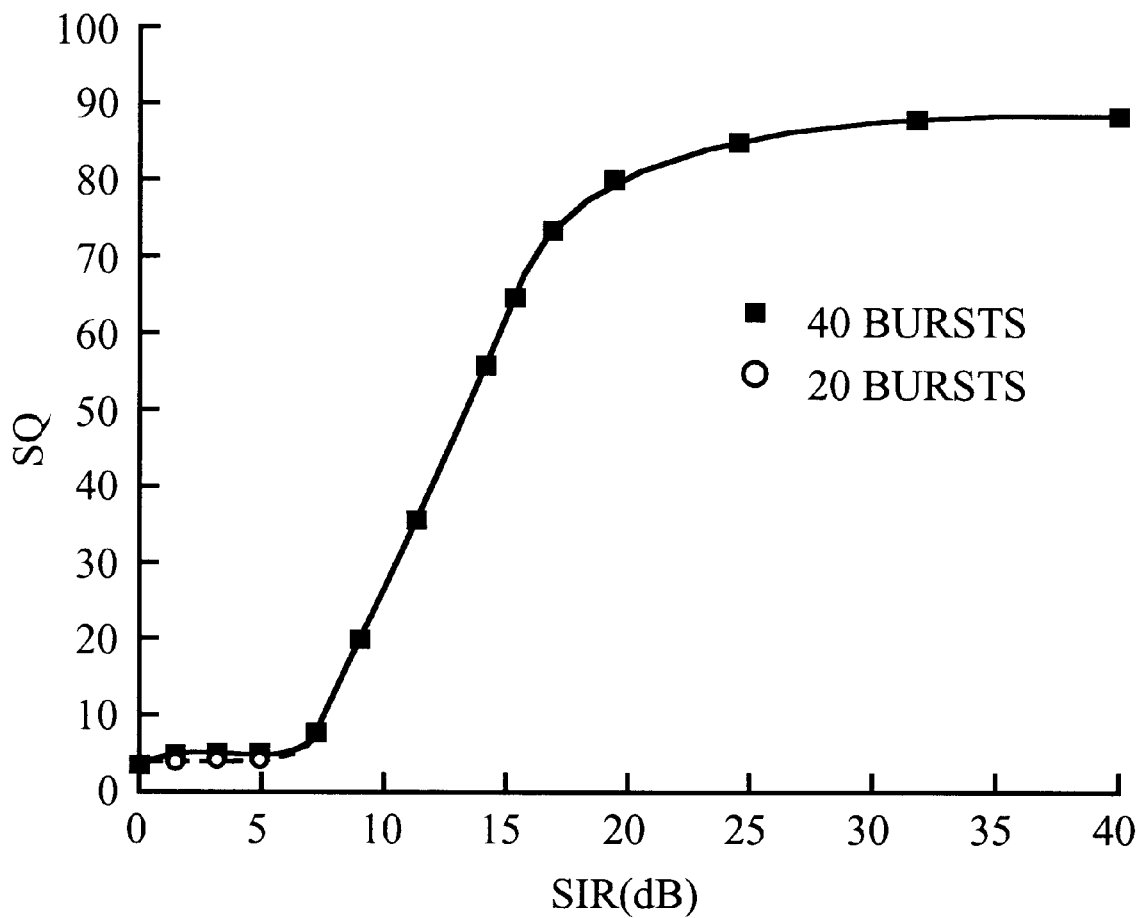
FIG. 10 is a set of two graphs showing the simulated average estimated signal quality SQ versus SIR in an interference limited environment. The values on the SQ axes depend on a specific hardware implementation.

Since SQ is also estimated by the hardware during frequency offset estimation, we replaced the SQ measured by floating point calculation from the output of the phase recovery by the SQ estimated by the hardware using much less bit precision to repeat these same studies. The average SQ estimated by the hardware versus SIR is plotted in FIG. 10. The values on the SQ axes depend on a specific hardware implementation. Simulated cumulative distributions of SIRS, using SQ estimated by the hardware for mapping, are plotted in FIG. 11. This Figure also shows that combining diversity in the hardware simulations experience small degradation (less than half a dB) from the optimum solutions under the given quantized complex weight constraint.

Figure 9:
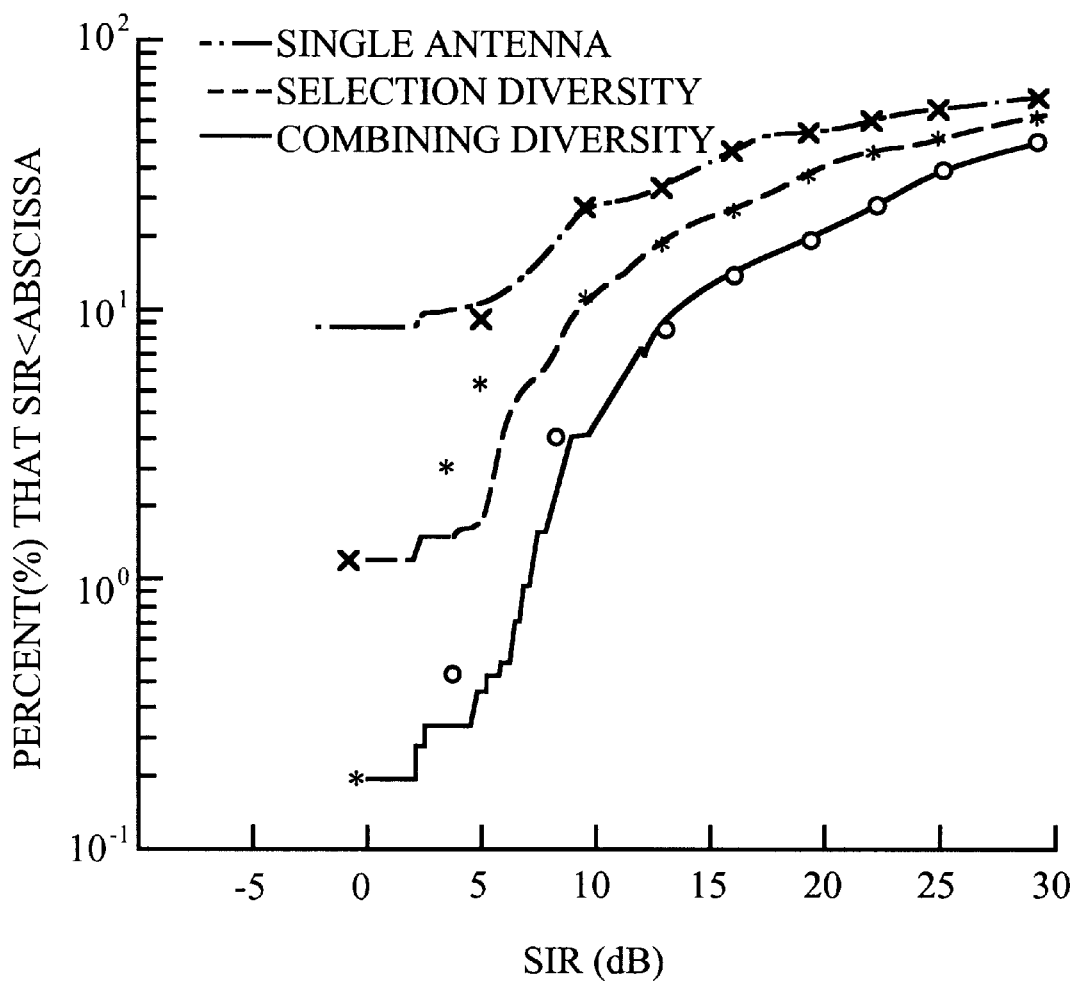
FIG. 9 is a set of three graphs showing hardware computer simulation results for two receiving antennas 10, 20 located at the statistically worst area. Macroscopic diversity based on channel power measurement is incorporated. $C_s$ n and $\sigma$ are 8, 4 and 10 dB, respectively. Note that the 'x', '*' and 'o' points are the simulated results calculated from the signal carriers alone. The continuous curves are the results obtained through SQ measurement in the hardware simulations.
Figure 11:
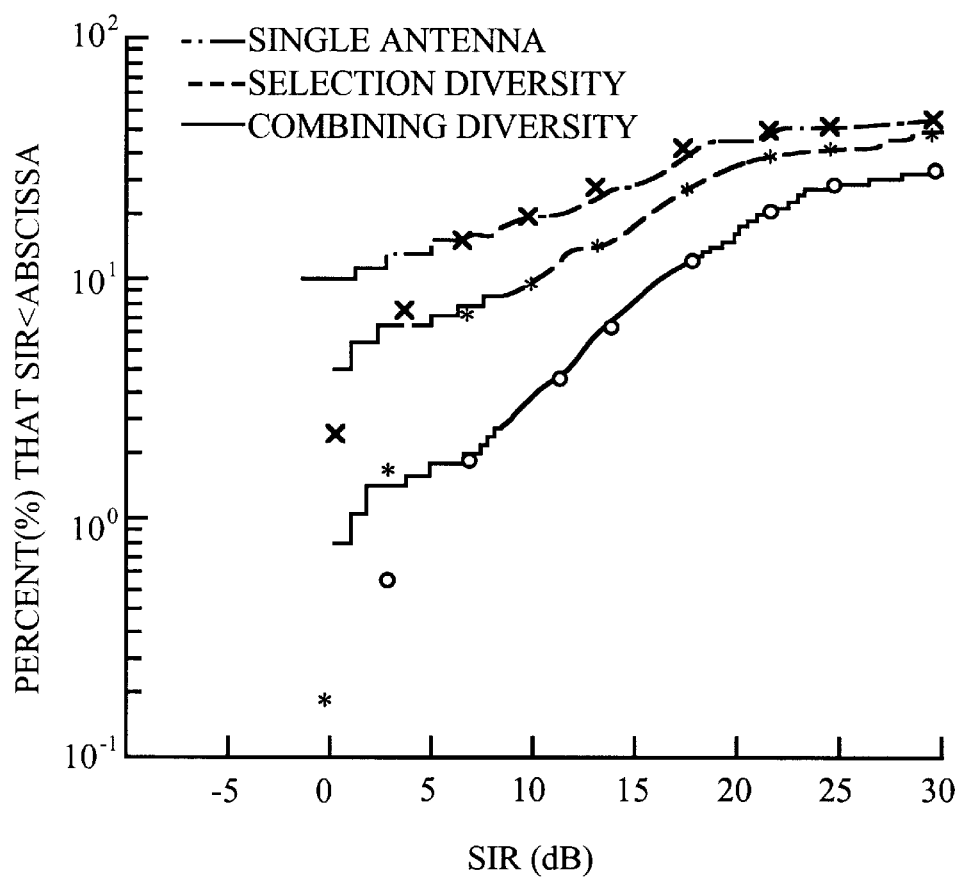
FIG. 11 is a set of three graphs showing hardware computer simulation results for two receiving antennas 10, 20 located at the statistically worst area. Macroscopic diversity based on channel power measurement is incorporated. $C_s$ n and $\sigma$ are 8, 4 and 10 dB, respectively. Note that the 'x', '*' and 'o' points are the simulated results calculated from the signal carriers alone. The continuous curves are the results obtained through SQ by the hardware.

For SIRs between 8 dB and 20 dB, both FIG. 9 and FIG. 11 agree with FIG. 4 presented in reference [3] for the single antenna and selection diversity cases. For this SIR region, combining diversity of the present invention has less than (0.5+0.3) dB degradation when compared to the results given in reference [3]. The extra 0.3 dB degradation is due to the use of k=2 and Δθ=45° in Equation 1 in the hardware simulations instead of the k=3 and Δθ=18° which are used in reference [3]. SIR improvements for the other cases described in reference [3] are expected to experience about the same amount of degradation. Therefore, diversity combining of the present invention gives wireless communication systems an SIR improvement of at least 3 dB over conventional two-antenna selection diversity [reference 3].

Table 1 summarizes the error statistics in the hardware simulations of these 1483 independent received bursts. Average WER is defined as the ratio of the number of bursts that contain at least one bit error to the total number of bursts simulated. The average WERs for single antenna and selection diversity are 17.6% and 9.1% respectively. Reliable speech communications are not possible in such high WERs. Note that the WER of selection diversity cannot be approximated by the square of the WER of a single antenna. This is because there is correlation between the signals received on the two antennas because of the log-normal fading, even though the Rayleigh fading is independent between the antennas. With diversity combining, the average WER is 4.9%, which is marginally acceptable for reliable speech communications. Using channel accessing procedures based on power and signal quality measurements can improve system performance by 7.4 dB [reference 3]. This additional SIR improvement will make reliable speech communications possible under these conditions while using the diversity combining of the present invention.

TABLE 1

|  | single antenna | selection diversity | combining diversity |
| --- | --- | --- | --- |
| no of bursts in error | 261 | 135 | 73 |
| average WER | 17.6% | 9.1% | 4.9 |

Hardware computer simulation results for 1483 received bursts.
Handset 25 is located at the statistically worst area.
Macrscopic diversity based on channel power measurement is incorporated.
$C_s$, n and σ are 8, 4 and 10 dB, respectively.

Table 1 also shows that two-antenna selection diversity recovers 48.3% of the bursts that are lost in the single antenna case without any diversity. Two-antenna diversity combining of the present invention recovers an additional 45.9% of the bursts that are lost in two-antenna selection diversity.

4.3 Frequency Selective Fading Mitigation

Figure 12A:
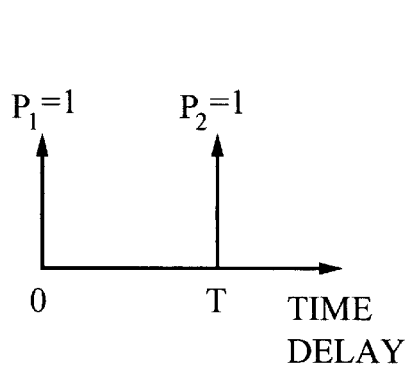
FIGS. 12A and 12B are two power delay profiles used to study the effectiveness of frequency selective fading mitigation using selection diversity and diversity combining. DS stands for delay spread. T is the time interval between channel impulses. $P_i$ is the variance of a complex Gaussian random process for the channel impulse response at time iT.
Figure 12B:
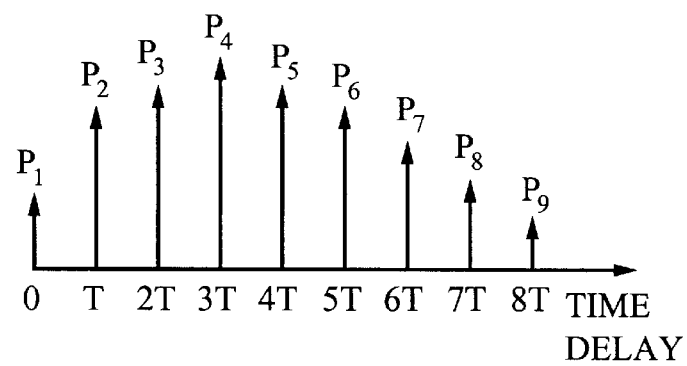

This section describes studies of the effectiveness of diversity combining and selection diversity in combating delay spread (frequency selective fading). Co-channel interference is not included in these simulations for delay spread. Two power-delay profiles-two ray and truncated Rayleigh-are used for these studies and are shown in FIGS. 12A and 12B, respectively. In FIG. 12A, T=2 DS, where DS is delay spread. In FIG. 12B, the channel impulse response at time iT is a zero-mean complex Gaussian random process with variance $P_i$ $$P_i = (i/4)e^{-i^2/32}$$

$$T^2 = (DS)^2/4.7$$

Table 2 summarizes the hardware simulation results for the average irreducible WERs of single antenna, selection diversity, and diversity combining of the present invention. All WERs except 0.1% and 0.3 % listed in the Table 2, contain more than 50 accumulated burst errors. Even for the limited number of errors accumulated (WERs of 0.1% and 0.3 %), the WERs are likely to be less than 1%. Normalized delay spread (d) is defined as the ratio of delay spread (DS) and symbol period. $WER_{single}$, $WER_{selection}$, and $WER_{combining}$ are the average irreducible word error rates for single antenna, selection diversity, and diversity combining of the present invention, respectively.

When d=0.2, WERs for both power-delay profiles are about the same in each individual case (single, selection, and combining). This is reasonable, since system performance is not sensitive to the shape of the power delay profile when the normalized delay spread is small [reference 10]. WERs for single antenna and selection diversity for d=0.2 agree reasonably well with the values presented in reference [8], which gives WERs for d up to 0.25.

TABLE 2

| Power Delay Profile | d | $WER_{single}$ | $WER_{selection}$ | $WER_{combining}$ |
| --- | --- | --- | --- | --- |
| Two-ray | 0.2 | 23.7% | 5.4% | 0.1%? |
| Two-ray | 0.4 | 63.4% | 40.7% | 3.1% |
| Rayleigh | 0.2 | 22.5% | 5.4% | 0.3%? |
| Rayleigh | 0.3 | 43.5% | 17.9% | 2.4% |
| Rayleigh | 0.4 | 58.9% | 35.6% | 6.6% |

Simulated average irreducible WERs for the two-ray power delay profile of FIG. 12A with d = 0.2, 0.4, and the truncated Rayleigh power delay profile of FIG. 12B with d = 0.2, 0.3, and 0.4.
All WERs except the two cases with less than 1% contain more than 50 accumulated burst errors.

Combining diversity of the present invention yields a worse system performance for the truncated Rayleigh power delay profile of FIG. 12B than for the two-ray power delay profile of FIG. 12A. This is expected, because with two antennas 10,20, only one radio path can be suppressed or optimized. With d=0.3 in the truncated Rayleigh power delay profile model, diversity combining has an average irreducible WER of 2.4%, which can still provide reasonably good speech communications. WER for diversity combining is expected to be less in the two-ray power delay profile model when d=0.3. From the studies presented in reference [8], for the same WER of 2.4%, selection diversity and single antenna without diversity can sustain normalized delay spread up to about 0.16 and 0.06, respectively.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method of diversity combining in a receiver, the method comprising:

receiving a first received signal at a first antenna of the receiver;

receiving a second received signal at a second antenna of the receiver;

selecting an optimal complex weight A from a predetermined finite set of discrete complex weights, wherein the discrete complex weights comprise discrete gains and discrete phases, and wherein the finite set of discrete complex weights has less than 100 complex weights;

varying the amplitude and phase of the first received signal in accordance with the selected optimal weight A; and combining the varied first received signal with the second received signal, wherein the optimal complex weight A is selected to maximize a signal-to-impairment ratio for the combined signal.

2. The method of claim 1 wherein the discrete gains are selected from the set $\{2^n: n \text{ an integer}\} \cup \{2^n + 2^{n+1}: n \text{ an integer}\}$.

3. The method of claim 2 wherein the discrete gains are selected from the set $\{2^n: n=-k, \ldots, k-1\} \cup \{2^n+2^{n+1}: n=-k, \ldots, k-2\}$, where k is an integer.

4. The method of claim 3 wherein the discrete gains are 0.25, 0.50, 0.75, 1.0, 1.5, 2, 3.

5. The method of claim 1 wherein the discrete phases are of the form $m\Delta\theta$, where m is an integer and $\Delta\theta$ evenly divides 360 degrees.

6. The method of claim 5 wherein the discrete phases are 0, 45, 90, 135, 180, 225, 270, 315.

7. The method of claim 1 wherein selecting the optimal complex weight A comprises computing a set of signal-to-impairment ratios corresponding to a subset of the finite set of discrete complex weights, wherein no two weights in the subset are adjacent to each other.

8. The method of claim 7 wherein selecting the optimal complex weight A further comprises:

selecting an approximately optimal complex weight from the subset of discrete complex weights, wherein the approximately optimal complex weight corresponds to a largest signal-to-impairment ratio in the set of computed signal-to-impairment ratios;

computing a second set of signal-to-impairment ratios corresponding to a second subset of the finite set of discrete complex weights, wherein the second subset comprises complex weights adjacent to the approximately optimal complex weight; and selecting the optimal complex weight A from the second subset of discrete complex weights.

9. The method of claim 1 wherein varying the amplitude and phase of the first received signal comprises delaying the first received signal in time by an amount determined from the discrete phase of the complex weight A.

10. A diversity combining radio receiver device comprising:

a first antenna coupled to a first received signal;

a second antenna coupled to a second received signal;

a signal varying circuit coupled to the first antenna, wherein the signal varying circuit varies the amplitude and phase of the first received signal in accordance with an optimal weight A selected from a predetermined finite set of discrete complex weights, wherein the discrete complex weights comprise discrete gains and discrete phases, and wherein the finite set of discrete complex weights has less than 100 complex weights;

a signal combining circuit coupled to the signal varying circuit and the second antenna, wherein the signal combining circuit combines a varied first received signal produced by the signal varying circuit with the second received signal;

wherein the optimal complex weight A maximizes a signal-to-impairment ratio for a combined signal produced by the signal combining circuit.

11. The device of claim 10 wherein the discrete gains are selected from the set $\{2^n: n \text{ an integer}\} \cup \{2^n+2^{n+1}: n \text{ an integer}\}$.

12. The device of claim 11 wherein the discrete gains are selected from the set $\{2^n: n=-k, \ldots, k-1\} \cup \{2^n+2^{n+1}: n=-k, k-2\}$, where k is an integer.

13. The device of claim 12 wherein the discrete gains are 0.25, 0.50, 0.75, 1.0, 1.5, 2, 3.

14. The device of claim 10 wherein the discrete phases are of the form $m\Delta\theta$, where m is an integer and $\Delta\theta$ evenly divides 360 degrees.

15. The device of claim 14 wherein the discrete phases are 0, 45, 90, 135, 180, 225, 270, 315.

16. The device of claim 10 further comprising a weight searching circuit, wherein the weight searching circuit computes a set of signal-to-impairment ratios corresponding to a subset of the finite set of discrete complex weights, wherein no two weights in the subset are adjacent to each other.

17. The device of claim 16 wherein the weight searching circuit selects an approximately optimal complex weight from the subset of discrete complex weights, wherein the approximately optimal complex weight corresponds to a largest signal-to-impairment ratio in the set of computed signal-to-impairment ratios; computes a second set of signal-to-impairment ratios corresponding to a second subset of the finite set of discrete complex weights, wherein the second subset comprises complex weights adjacent to the approximately optimal complex weight; and selects the optimal complex weight A from the second subset of discrete complex weights.

18. The device of claim 10 wherein the signal varying circuit delays the first received signal in time by an amount determined from the discrete phase of the complex weight A.

wherein the optimal complex weight A maximizes a signal-to-impairment ratio for a combined signal produced by the signal combining circuit.

19. A method of diversity combining in a receiver, the method comprising:

a) receiving a first received signal at a first antenna of the receiver;

b) receiving a second received signal at a second antenna of the receiver;

c) selecting a complex weight A from a predetermined finite set of discrete complex weights, wherein the discrete complex weights comprise various discrete gains and various discrete phases;

d) combining the first received signal with the second received signal such that the first received signal is scaled in amplitude and phase relative to the second received signal in accordance with the selected complex weight A;

e) calculating a signal-to-impairment ratio for the combined signal;

f) repeating steps (c), (d), and (e) for a subset of distinct complex weights; and g) selecting an optimal weight from the subset of distinct complex weights, wherein the optimal weight corresponds to a maximum signal-to-impairment ratio.

20. The method of claim 19 wherein the discrete gains comprise a largest discrete gain and a smallest discrete gain, wherein the largest discrete gain is larger than the smallest discrete gain by at least a factor of 2.

* * * * *